United States Patent Office 3,539,613
Patented Nov. 10, 1970

3,539,613
PLANT HORMONE CARBOXYLIC ACID SALT OF AN AMINATED POLYOXYETHYLENE ALIPHATIC AMINE OR ALIPHATIC ALCOHOL
Thomas J. Galvin and Frank S. Black, Wilmington, Del., assignors to Atlas Chemical Industries, Inc., Wilmington, Del., a corporation of Delaware
No Drawing. Original application Apr. 15, 1964, Ser. No. 360,106, now Patent No. 3,385,884, dated May 28, 1968. Divided and this application Jan. 26, 1968, Ser. No. 700,731
Int. Cl. C09f 7/00
U.S. Cl. 260—404.5        4 Claims

ABSTRACT OF THE DISCLOSURE

Herbicide composition which are salts of fatty amine materials selected from the group consisting of aminated polyoxyethylene derivatives of amines and aminated polyoxyethylene derivatives of alcohols and plant hormone carboxylic acids or mixtures of plant hormone carboxylic acids and aliphatic acids.

---

This is a division of application Ser. No. 360,106, filed Apr. 15, 1964, now U.S. Pat. No. 3,385,884. The present invention relates to herbicide salt compositions and in particular, to aminated polyoxyethylene fatty amine salts of plant hormone carboxylic acids.

The use of plant hormones to destroy undesired broad leafed plants is well-known. Examples of popular plant hormones in the form of plant hormone carboxylic acids which are eminently suited to use in the present compositions are: 2,4-dichloro phenoxyacetic acid, (2,4-D); 2,4,5-trichloro phenoxy acetic acid, (2,4,5-T); trichloroacetic acid; β-indolylacetic acid; indolylbutyric acid, indolylpropionic acid; phenylacetic acid, and; fluoro acetic acid. The most widely used plant hormone carboxylic acids are 2,4-D and 2,4,5-T.

Generally herbicide compositions are applied to undesired plants by spraying a water or an oil solution or emulsion of the herbicides composition on the plant foliage. 2,4-D and 2,4,5-T frequently form a highly undesired calcium salt precipitate when water containing a high calcium content is used as a carrier or solvent. The acids, per se, and the calcium salts of the acids are volatile and in addition to lowering the shelf life of such solutions, may cause damage to areas other than the area desired to be treated with a herbicide by volatilization and drifting. Esters of the acids formed from readily available short chain carbon alkyl alcohols usually also exhibit such undesired volatility. The use of longer carbon chain alcohols to solve the problem of volatility generally results in a material which is insoluble in water and which must be applied in an emulsion form entailing added costs of solvents and emulsifying agents.

The present herbicide salt compositions are dispersible in both water and hydrocarbon solvents. The present salt compositions do not precipitate calcium salts when used in water mixtures having a high calcium content. The present salts are capable of acting as oil-in-water type emulsifiers and do not require additional emulsifying agents to facilitate their use in the form of oil-in-water emulsions. In addition the present salts exhibit very low volatility.

The present herbicide compositions are salts of plant hormone carboxylic acids and a fatty amine material selected from the group consisting of (1) a reaction product of an aminating agent selected from the group consisting of ammonia, primary amines and secondary amines, said primary and secondary amines containing from 1 to 6 carbon atoms, and a polyoxyethylene derivative of an amine having an aliphatic radical of from 10 to 20 carbon atoms, the derivative containing from 2 to 20 moles of ethylene oxide units for each equivalent of amino hydrogen in said amine, and; (2) a reaction product of an aminating agent selected from the group consisting of ammonia, primary amines and secondary amines, the primary and secondary amines containing from 1 to 6 carbon atoms and a polyoxyethylene derivative of an alcohol containing an aliphatic radical of from 6 to 20 carbon atoms, the derivative containing from 2 to 20 moles of ethylene oxide units for each hydroxyl equivalent in the alcohol. For example, oxyalkylene derivatives of the following alcohols are generally useful in the present invention: tridecyl alcohol, triethylene glycol, nonylphenol, and sorbitol.

The present herbicide salt compositions may be prepared by simply mixing the components intimately together and slightly heating. In order to obtain a near neutral product which may be handled without undue precaution because of corrosive characteristics, the amount of plant hormone carboxylic acid is preferably about equivalent to the amount which will react with the available amino groups in the amine. In a herbicide composition the present amine reaction products perform a two-fold purpose in thta they have surfactant properties and they also contain available amino groups to react with plant hormone carboxylic acid. Preferably the 0.3 to 1.0 equivalent of plant hormone carboxylic acid is reacted per equivalent of an aminated polyoxyalkylene fatty amine and one equivalent of plant hormone carboxylic acid is reacted per equivalent of aminated polyalkylene alkyl alcohol.

The surfactant properties of the product may be varied if an aliphatic fatty acid containing from 2 to 20 carbon atoms, e.g., acetic, propyl, butyl, oleic, and stearic acids, is used to react with some of the available amino groups in the amine reaction product. The present salts must include at least 0.33 equivalent of plant hormone carboxylic acid. Thus, from 0 to 0.66 equivalent of fatty acid may be reacted with an equivalent of an aminated polyalkylene fatty amine and from 0 to 0.66 equivalent with an equivalent of an aminated polyalkylene alkyl alcohol.

Description of aminated polyoxyalkylene fatty amines aptly suited to use in the present invention, along with descriptions of suitable methods of preparing such amines, are given in detail in application Ser. No. 360,125, filed Apr. 15, 1964, now U.S. Pat. No. 3,352,916 by John D. Zech and in application Ser. No. 360,129, filed Apr. 15, 1964, now U.S. Pat. No. 3,373,204 by R. A. Hales and F. A. Hughes.

The following examples are illustrative of the preparation of herbicidal compositions compounded in accord with the present invention. For simplicity, the nomenclature used in describing the amine reactants states the parent compound followed by the number of amino groups which have been substituted for hydroxyl groups.

EXAMPLE 1

0.3 mole of 2,4,5-T was thoroughly mixed with 0.1 mole of 20 polyoxyethylene Armeen TD diamine [aminated 20 polyoxyethylene Armeen TD]. Armeen TD is a product of Armour and Co. and consists of 97% by weight of a primary amine by titration, has a mole combining weight of 271, a M.P. of approximately 41° C. and the primary amine portion has a mean mole weight of 263 and is composed of approximately 30% by weight hexadecyl, 25% octadecyl and 45% octadecenyl amines. In order to insure an intimate mixing of the components a slight amount of heat was applied during the mixing step. A dark homogeneous product formed. The product was tested for solubility in water containing 342 p.p.m. of calcium and in xylene. The product was found to be soluble in the water containing 342 p.p.m. calcium with no precipitation of a calcium salt. The product was found to be soluble in xylene. When a xylene solution of the product, about 95 parts by weight xylene and 5 parts by weight of the product, was added to water an emulsion stable over a time period of 15 minutes was obtained. A sample of the emulsion was sprayed on a test strip of broad-leafed plants and was found to be an excellent herbicide.

EXAMPLE 2

The procedure of Example 1 was followed except that the starting materials consisted of 0.2 mol of 2,4,5-T, 0.1 mol of oleic acid and 0.1 mol of 20 polyoxyethylene Armeen TD diamine. The product was again a dark homogeneous liquid. The product was found to be soluble in a sample of water containing 342 p.p.m. of calcium. The product was found to be soluble in xylene and in solution with xylene (5% by weight product), was found to form an emulsion with water which is stable over a time period of 15 minutes. The emulsion product was tested in a manner similar to Example 1 and also found to be an excellent herbicide.

EXAMPLE 3

The procedure of Example 1 was followed except that the starting material consisted of 0.5 mol of 2,4-D and 1.0 mol of 6 polyoxyethylene tridecyl monoamine [aminated 6 polyoxyethylene tridecyl alcohol]. The product was a dark homogeneous liquid which was dispensible in water and soluble in xylene. In solution with xylene (5% by weight) was found to form an emulsion with water which was stable over a period of 15 minutes. The emulsion product was sprayed on a test strip containing broad-leafed plants and was found to be an excellent herbicide.

What is claimed is:
1. A mixed salt of
    a reaction product of an aminating agent selected from the group consisting of ammonia, primary amines and secondary amines, said primary and secondary amines containing from 1 to 6 carbon atoms, and
    a polyoxyethylene derivative of an amine containing a saturated aliphatic hydrocarbon radical of from 10 to 20 carbon atoms,
    said derivative containing from 2 to 20 mols of ethylene oxide units for each equivalent of amino hydrogen in said amine, and
    a plant hormone carboxylic acid and an aliphatic fatty acid containing from 2 to 20 carbon atoms, said mixed salt containing at least 0.33 equivalents of plant hormone carboxylic acid.
2. A salt of claim 1 wherein the plant hormone carboxylic acid is selected from the group consisting of 2,4-dichlorophenoxyacetic acid, 2,4,5-trichloro phenoxyacetic acid, trichloroacetic acid, β-indolylacetic acid, indolylbutyric acid, indolylpropionic acid, phenylacetic acid, and fluoro acetic acid.
3. The salt of claim 2 wherein the plant hormone carboxylic acid is 2,4,5-trichlorophenoxyacetic acid.
4. The salt of claim 2 wherein the plant hormone carboxylic acid is 2,4-dichloro phenoxyacetic acid.

References Cited

UNITED STATES PATENTS

| | | | |
|---|---|---|---|
| 2,606,830 | 8/1952 | Kamlet et al. | 71—117 |
| 2,843,471 | 7/1958 | Fischer | 71—113 |
| 2,956,067 | 10/1960 | De Groote et al. | 260—404.5 |
| 3,206,485 | 9/1965 | Pflaumer | 260—404.5 |
| 3,347,926 | 10/1967 | Zech | 260—585 |
| 3,352,916 | 11/1967 | Zech | 260—585 |
| 3,373,204 | 3/1968 | Hales et al. | 260—585 |
| 3,385,884 | 5/1968 | Galvin et al. | 260—585 |

FOREIGN PATENTS 857,387   12/1960   Great Britain.

LEWIS GOTTS, Primary Examiner

G. HOLLRAH, Assistant Examiner

U.S. Cl. X.R.

260—501.1, 501.16, 326.14; 71—96, 113, 116, 117